US008338551B2

(12) United States Patent
Jacobsen et al.

(10) Patent No.: US 8,338,551 B2
(45) Date of Patent: Dec. 25, 2012

(54) POLYMER FILMS

(75) Inventors: Grant Berent Jacobsen, Abbotsbury (AU); Claudine Viviane Lalanne-Magne, Saint Mitre les Remparts (FR); Sergio Mastroianni, Etterbeek (BE); Melanie Muron, Istres (FR); Eric Nicolas Vincent Osmont, Martigues (FR)

(73) Assignee: Ineos Europe Limited, Hampshire (GB)

( * ) Notice: Subject to any disclaimer, the term of this patent is extended or adjusted under 35 U.S.C. 154(b) by 639 days.

(21) Appl. No.: 12/225,098

(22) PCT Filed: Mar. 6, 2007

(86) PCT No.: PCT/GB2007/000785
§ 371 (c)(1),
(2), (4) Date: Feb. 12, 2009

(87) PCT Pub. No.: WO2007/104924
PCT Pub. Date: Sep. 20, 2007

(65) Prior Publication Data
US 2009/0233091 A1    Sep. 17, 2009

(30) Foreign Application Priority Data
Mar. 14, 2006   (EP) ..................................... 06251356

(51) Int. Cl.
C08F 4/64      (2006.01)
C08F 4/76      (2006.01)
C08F 4/52      (2006.01)
C08F 210/02    (2006.01)
C08F 210/16    (2006.01)

(52) U.S. Cl. ........ 526/160; 526/170; 526/161; 526/172; 526/348; 526/348.5; 526/348.6; 526/348.2

(58) Field of Classification Search ................ 526/348.5, 526/352, 161, 172, 348, 134, 160
See application file for complete search history.

(56) References Cited

U.S. PATENT DOCUMENTS

| 5,258,161 | A  | * | 11/1993 | Ealer ............................. 264/566 |
| 5,859,138 | A  | * | 1/1999 | Bonner et al. ................. 525/185 |
| 6,437,047 | B1 | * | 8/2002 | Cecchin et al. ............... 525/191 |
| 6,562,905 | B1 | * | 5/2003 | Nummila-Pakarinen et al. ............................. 525/191 |
| 6,878,454 | B1 | * | 4/2005 | Shannon et al. .............. 428/523 |
| 6,924,351 | B2 | * | 8/2005 | Gralinski et al. ............. 528/483 |
| 6,995,235 | B1 | * | 2/2006 | Ehrman et al. ............ 528/502 R |
| 7,090,927 | B2 | * | 8/2006 | Shannon et al. .............. 428/523 |
| 7,101,629 | B2 | * | 9/2006 | Shannon et al. .............. 428/523 |
| 7,393,916 | B2 | * | 7/2008 | Neubauer et al. ............. 528/480 |
| 7,442,750 | B2 | * | 10/2008 | Jacobsen et al. .............. 526/115 |
| 7,741,415 | B2 | * | 6/2010 | Conrad et al. .................. 526/65 |
| 2007/0049711 | A1 | * | 3/2007 | Kuo et al. ...................... 526/113 |
| 2008/0051528 | A1 | * | 2/2008 | Schouterden et al. .......... 526/65 |
| 2009/0318642 | A1 | * | 12/2009 | Kokko et al. .................... 526/90 |

FOREIGN PATENT DOCUMENTS

| WO | 94/14855 | 7/1994 |
| WO | 94/21691 | 9/1994 |
| WO | 95/11263 | 4/1995 |
| WO | 98/42777 | 10/1998 |

OTHER PUBLICATIONS

International Search Report for PCT/GB2007/000785, mailed Jul. 12, 2007.
Written Opinion of the International Searching Authority for PCT/GB2007/00785, mailed Jul. 12, 2007.
Notification concerning Transmittal of International Preliminary Report on Patentability; International Application No. PCT/GB2007/000785; International Preliminary Filing Date Mar. 6, 20007 (8 pgs).

* cited by examiner

*Primary Examiner* — Rip A. Lee
(74) *Attorney, Agent, or Firm* — Nixon & Vanderhye

(57) ABSTRACT

Method for the preparation of a blown film containing 300-600 gels/m$^2$ of size in the range 100-2000 μm as measured by an optical control system, in which the film is derived by extrusion from an ethylene-α-olefin copolymer. The method is carried out by preparing the copolymer in a particle forming polymerization process in the presence of a single site catalyst system containing a single site catalyst, a cocatalyst, and a support material.

23 Claims, No Drawings

POLYMER FILMS

This application is the U.S. national phase of International Application No. PCT/GB2007/000785, filed 6 Mar. 2007, which designated the U.S. and claims priority to EP 06251356.9, filed 14 Mar. 2006, the entire contents of each of which are hereby incorporated by reference.

The present invention relates to polymer films and to polyethylene films having reduced gels therein. The films are produced from polymers prepared by the polymerization of olefins in particular in the presence of supported single site polymerisation catalysts especially supported metallocene catalysts which can provide advantages for operation in gas phase processes.

In recent years there have been many advances in the production of polyolefin homopolymers and copolymers due to the introduction of metallocene catalysts. Metallocene catalysts offer the advantage of generally a higher activity than traditional Ziegler catalysts and are usually described as catalysts which are single site in nature. There have been developed several different families of metallocene complexes. In earlier years catalysts based on bis(cyclopentadienyl) metal complexes were developed, examples of which may be found in EP 129368 or EP 206794. More recently complexes having a single or mono cyclopentadienyl ring have been developed. Such complexes have been referred to as 'constrained geometry' complexes and examples of these complexes may be found in EP 416815 or EP 420-436. In both of these complexes the metal atom e.g. zirconium is in the highest oxidation state.

Other complexes however have been developed in which the metal atom may be in a reduced oxidation state. Examples of both the bis(cyclopentadienyl) and mono (cyclopentadienyl) complexes have been described in WO 96/04290 and WO 95/00526 respectively.

The above metallocene complexes are utilised for polymerisation in the presence of a cocatalyst or activator. Typically activators are aluminoxanes, in particular methyl aluminoxane or alternatively may be compounds based on boron compounds. Examples of the latter are borates such as trialkyl-substituted ammonium tetraphenyl-or tetrafluorophenyl-borates or triarylboranes such as tris(pentafluorophenyl) borane. Catalyst systems incorporating borate activators are described in EP 561479, EP 418044 and EP 551277.

The above metallocene complexes may be used for the polymerisation of olefins in solution, slurry or gas phase. When used in the slurry or gas phase the metallocene complex and/or the activator are suitably supported. Typical supports include inorganic oxides e.g. silica or polymeric supports may alternatively be used.

Examples of the preparation of supported metallocene catalysts for the polymerisation of olefins may be found in WO 94/26793, WO 95/07939, WO 96/00245, WO 96/04318, WO 97/02297 and EP 642536.

Supported metallocene catalyst systems are particularly suitable for use in processes for the copolymerisation of ethylene with one or more other alpha-olefins. Typically the resultant copolymers may have densities in the range 0.900-0.940 and may be referred to as linear low density polyethylene (LLDPE).

Typically such copolymers may be suitably prepared in the slurry or gas phase and may be suitably converted into polymer films for example blown films.

Metallocene-catalysed linear low density polyethylene films typically have better clarity and are more impact resistant then those made from conventional linear low density polyethylene. Low levels of long chain branching in metallocene based linear low density polyethylene films also improve their tear strength.

A disadvantage however that may occur in such films is the presence of gels which may lead to imperfections in clarity. This is particularly relevant for films used for food packaging such as bread bags and fresh produce packages or for merchandising applications where clarity is obviously important.

Gels are flaws in polyethylene films consisting for example of un-molten non-homogenised material and may in linear low density polyethylene (LLDPE) films be composed of high density polymethylene species. Gels may be present as a result of either catalyst or process phenomenon or both.

We have now surprisingly found that the amount of gels present in polymer films may be reduced wherein the copolymers are prepared in a particle forming polymerisation process in the gas phase in the presence of certain single site catalyst systems.

Thus according to the present invention there is provided a method for the preparation of a film containing 300-600 gels/$m^2$ of size in the range 100-2000 μm as measured by an optical control system (OCS) as herein described, said film being derived from an ethylene-α-olefin copolymer characterised in that said copolymer is prepared in a particle forming polymerisation process in the presence of a single site catalyst system.

By particle forming polymerisation process is meant a process wherein polymer particles are formed for example a gas phase or slurry phase process.

Preferably the films of the present invention contain 300-500 gels/$m^2$ of size in the range 100-2000 μm as measured by the optical control system (OCS).

Preferred films according to the present invention are blown films.

The copolymers used to prepare the novel films of the present invention are most suitably prepared by use of a supported single site catalyst system.

Suitable supported single site catalyst systems comprise
(a) a single site catalyst,
(b) a cocatalyst, and
(c) a support material.

Preferred single site catalysts comprise metallocene complexes based on Group IVA metals for example titanium, zirconium and hafnium.

Suitable metallocene complexes may be represented by the general formula:

$$L_xMQ_n$$

where L is a cyclopentadienyl ligand, M is a Group IVA metal, Q is a leaving group and x and n are dependent upon the oxidation state of the metal.

Typically the Group IVA metal is titanium, zirconium or hafnium, x is either 1 or 2 and typical leaving groups include halogen or hydrocarbyl. The cyclopentadienyl ligands may be substituted for example by alkyl or alkenyl groups or may comprise a fused ring system such as indenyl or fluorenyl.

Examples of suitable metallocene complexes are disclosed in EP 129368 and EP 206794. Such complexes may be unbridged e.g. bis(cyclopentadienyl) zirconium dichloride, bis(pentamethyl)cyclopentadienyl dichloride, or may be bridged e.g. ethylene bis(indenyl) zirconium dichloride or dimethylsilyl(indenyl) zirconium dichloride.

Other suitable bis(cyclopentadienyl) metallocene complexes are those bis(cyclopentadienyl) diene complexes described in WO 96/04290. Examples of such complexes are bis(cyclopentadienyl) zirconium (2.3-dimethyl-1,3-butadiene) and ethylene bis(indenyl) zirconium 1,4-diphenyl butadiene.

Preferred metallocenes for use in the method of the present invention are monocyclopentadienyl complexes.

Examples of monocyclopentadienyl or substituted monocyclopentadienyl complexes suitable for use in the present invention are described in EP 416815, EP 418044, EP 420436 and EP 551277. Suitable complexes may be represented by the general formula:

$$CpMX_n$$

wherein Cp is a single cyclopentadienyl or substituted cyclopentadienyl group optionally covalently bonded to M through a substituent, M is a Group VIA metal bound in a $\eta^5$ bonding mode to the cyclopentadienyl or substituted cyclopentadienyl group, X each occurrence is hydride or a moiety selected from the group consisting of halo, alkyl, aryl, aryloxy, alkoxy, alkoxyalkyl, amidoalkyl, siloxyalkyl etc. having up to 20 non-hydrogen atoms and neutral Lewis base ligands having up to 20 non-hydrogen atoms or optionally one X together with Cp forms a metallocycle with M and n is dependent upon the valency of the metal.

Particularly preferred monocyclopentadienyl complexes have the formula:

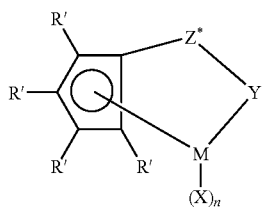

wherein:—

R' each occurrence is independently selected from hydrogen, hydrocarbyl, silyl, germyl, halo, cyano, and combinations thereof, said R' having up to 20 nonhydrogen atoms, and optionally, two R' groups (where R' is not hydrogen, halo or cyano) together form a divalent derivative thereof connected to adjacent positions of the cyclopentadienyl ring to form a fused ring structure;

X is hydride or a moiety selected from the group consisting of halo, alkyl, aryl, aryloxy, alkoxy, alkoxyalkyl, amidoalkyl, siloxyalkyl etc. having up to 20 non-hydrogen atoms and neutral Lewis base ligands having up to 20 non-hydrogen atoms, Y is —O—, —S—, —NR*—, —PR*—, M is hafnium, titanium or zirconium, Z* is SiR*$_2$, CR*$_2$, SiR*$_2$SIR*$_2$, CR*$_2$CR*$_2$, CR*=CR*, CR*$_2$SIR*$_2$, or GeR*$_2$, wherein:

R* each occurrence is independently hydrogen, or a member selected from hydrocarbyl, silyl, halogenated alkyl, halogenated aryl, and combinations thereof, said R* having up to 10 non-hydrogen atoms, and optionally, two R* groups from Z* (when R* is not hydrogen), or an R* group from Z* and an R* group from Y form a ring system,
and n is 1 or 2 depending on the valence of M.

Examples of suitable monocyclopentadienyl complexes are (tert-butylamido) dimethyl (tetramethyl-$\eta^5$-cyclopentadienyl) silanetitanium dichloride and (2-methoxyphenylamido) dimethyl (tetramethyl-$\eta^5$-cyclopentadienyl) silanetitanium dichloride.

Other suitable monocyclopentadienyl metallocene complexes are those comprising phosphinimine ligands described in WO 99/40125, WO 00/05237, WO 00/05238 and WO00/32653. A typical examples of such a complex is cyclopentadienyl titanium [tri (tertiary butyl) phosphinimine] dichloride.

Particularly preferred metallocene complexes for use in the preparation of the supported catalysts of the present invention may be represented by the general formula:

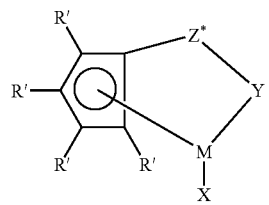

wherein:—

R' each occurrence is independently selected from hydrogen, hydrocarbyl, silyl, germyl, halo, cyano, and combinations thereof, said R' having up to 20 nonhydrogen atoms, and optionally, two R' groups (where R' is not hydrogen, halo or cyano) together form a divalent derivative thereof connected to adjacent positions of the cyclopentadienyl ring to form a fused ring structure;

X is a neutral $\eta^4$ bonded diene group having up to 30 non-hydrogen atoms, which forms a $\pi$-complex with M;

Y is —O—, —S—, —NR*—, —PR*—,

M is titanium or zirconium in the +2 formal oxidation state;

Z* is SiR*$_2$, CR*$_2$, SiR*$_2$SIR*$_2$, CR*$_2$CR*$_2$, CR*=CR*, CR*$_2$SIR*$_2$, or

GeR*$_2$, wherein:

R* each occurrence is independently hydrogen, or a member selected from hydrocarbyl, silyl, halogenated alkyl, halogenated aryl, and combinations thereof, said R* having up to 10 non-hydrogen atoms, and optionally, two R* groups from Z* (when R* is not hydrogen), or an R* group from Z* and an R* group from Y form a ring system.

Examples of suitable X groups include s-trans-$\eta^4$-1,4-diphenyl-1,3-butadiene, s-trans-$\eta^4$-3-methyl-1,3-pentadiene; s-trans-$\eta^4$-2,4-hexadiene; s-trans-$\eta^4$-1,3-pentadiene; s-trans-$\eta^4$-1,4-ditolyl-1,3-butadiene; s-trans-$\eta^4$-1,4-bis(trimethylsilyl)-1,3-butadiene; s-cis-$\eta^4$-3-methyl-1,3-pentadiene; s-cis-$\eta^4$-1,4-dibenzyl-1,3-butadiene; s-cis-$\eta^4$-1,3-pentadiene; s-cis-$\eta^4$-1,4-bis(trimethylsilyl)-1,3-butadiene, said s-cis diene group forming a $\pi$-complex as defined herein with the metal.

Most preferably R' is hydrogen, methyl, ethyl, propyl, butyl, pentyl, hexyl, benzyl, or phenyl or 2 R' groups (except hydrogen) are linked together, the entire $C_5R'_4$ group thereby being, for example, an indenyl, tetrahydroindenyl, fluorenyl, terahydrofluorenyl, or octahydrofluorenyl group.

Highly preferred Y groups are nitrogen or phosphorus containing groups containing a group corresponding to the formula —N(R")— or —P(R")— wherein R" is $C_{1-10}$ hydrocarbyl.

Most preferred complexes are amidosilane-or amidoalkanediyl complexes.

Most preferred complexes are those wherein M is titanium.

Specific complexes suitable for use in the preparation of the supported catalysts of the present invention are those disclosed in WO 95/00526 and are incorporated herein by reference.

A particularly preferred complex for use in the preparation of the supported catalysts of the present invention is (t-butylamido) (tetramethyl-$\eta^5$-cyclopentadienyl) dimethyl silanetitanium-$\eta^4$-1.3-pentadiene.

Suitable cocatalysts for use in the catalyst system of the present invention are those typically used with the aforementioned single site catalysts.

These include boranes such as tris(pentafluorophenyl) borane and borates.

Suitable organoboron compounds include triarylboron compounds. A particularly preferred triarylboron compound is tris(pentafluorophenyl) borane.

Other compounds suitable as cocatalysts are compounds which comprise a cation and an anion. The cation is typically a Bronsted acid capable of donating a proton and the anion is typically a compatible non-coordinating bulky species capable of stabilizing the cation.

Such cocatalysts may be represented by the formula:

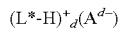

wherein
L* is a neutral Lewis base
(L*-H)$^+_d$ is a Bronsted acid
A$^{d-}$ is a non-coordinating compatible anion having a charge of d$^-$, and
d is an integer from 1 to 3.

The cation of the ionic compound may be selected from the group consisting of acidic cations, carbonium cations, sylium cations, oxonium cations, organometallic cations and cationic oxidizing agents.

Suitably preferred cations include trihydrocarbyl substituted ammonium cations eg. triethylammonium, tripropylammonium, tri(n-butyl)ammonium and similar. Also suitable are N,N-dialkylanilinium cations such as N,N-dimethylanilinium cations.

The preferred ionic compounds used as cocatalysts are those wherein the cation of the ionic compound comprises a hydrocarbyl substituted ammonium salt and the anion comprises an aryl substituted borate.

Typical borates suitable as ionic compounds include:
triethylammonium tetraphenylborate
triethylammonium tetraphenylborate,
tripropylammonium tetraphenylborate,
tri(n-butyl)ammonium tetraphenylborate,
tri(t-butyl)ammonium tetraphenylborate,
N,N-dimethylanilinium tetraphenylborate,
N,N-diethylanilinium tetraphenylborate,
trimethylammonium tetrakis(pentafluorophenyl) borate,
triethylammonium tetrakis(pentafluorophenyl) borate,
tripropylammonium tetrakis(pentafluorophenyl) borate,
tri(n-butyl)ammonium tetrakis(pentafluorophenyl) borate,
N,N-dimethylanilinium tetrakis(pentafluorophenyl) borate,
N,N-diethylanilinium tetrakis(pentafluorophenyl) borate.

A preferred type of cocatalyst suitable for use with the single site catalysts of the present invention comprise ionic compounds comprising a cation and an anion wherein the anion has at least one substituent comprising a moiety having an active hydrogen.

Suitable cocatalysts of this type are described in WO 98/27119 the relevant portions of which are incorporated herein by reference.

Examples of this type of anion include:
triphenyl(hydroxyphenyl) borate
tri (p-tolyl)(hydroxyphenyl) borate
tris (pentafluorophenyl)hydroxyphenyl) borate
tris (pentafluorophenyl)(4-hydroxyphenyl) borate Examples of suitable cations for this type of cocatalyst include
triethylammonium, triisopropylammonium, diethylmethylammonium, dibutylethylammonium and similar.

Particularly suitable are those cations having longer alkyl chains such as dihexyldecylmethylammonium, dioctadecylmethylammonium, ditetradecylmethylammonium, bis(hydrogentated tallow alkyl)methylammonium and similar.

Particular preferred cocatalysts of this type are alkylammonium tris(pentafluorophenyl) 4-(hydroxyphenyl) borates. A particularly preferred cocatalyst is bis(hydrogenated tallow alkyl)methyl ammonium tris (pentafluorophenyl) (4-hydroxyphenyl) borate.

With respect to this type of cocatalyst, a preferred compound is the reaction product of an alkylammonium tris(pentafluorophenyl)-4-(hydroxyphenyl) borate and an organometallic compound, for example triethylaluminium.

Suitable support materials include inorganic metal oxides or alternatively polymeric supports may be used for example polyethylene, polypropylene, clays, zeolites, etc.

Suitable inorganic metal oxides are $SiO_2$, $Al_2O_3$, MgO, $ZrO_2$, $TiO_2$, $B_2O_3$, CaO, ZnO and mixtures thereof.

The most preferred support material for use with the supported catalysts according to the method of the present invention is silica. Suitable silicas include Ineos ES70 and Grace Davison 948 silicas.

The support material may be subjected to a heat treatment and/or chemical treatment to reduce the water content or the hydroxyl content of the support material. Typically chemical dehydration agents are reactive metal hydrides, aluminium alkyls and halides. Prior to its use the support material may be subjected to treatment at 100° C. to 1000° C. and preferably at 200 to 850° C. in an inert atmosphere under reduced pressure.

The porous supports are preferably pretreated with an organometallic compound preferably an organoaluminium compound and most preferably a trialkylaluminium compound in a dilute solvent.

Preferred trialkylaluminium compounds are triethylaluminium or triisobutylaluminium.

The support material is pretreated with the organometallic compound at a temperature of −20° C. to 150° C. and preferably at 20° C. to 100° C.

Other suitable supports may be those described in our application GB 03/05207.

The supported single-site catalysts of the present invention may be prepared by a method comprising
  (i) contacting together in a suitable solvent
    (a) a single site catalyst,
    (b) a non-aluminoxane cocatalyst, and
    (c) a support material
  (ii) removal of the solvent.

Suitable solvents for use in the preparation of the supported catalysts of the present invention are aliphatic or aromatic hydrocarbons for example pentane, isohexane, heptane, toluene or similar.

The preparation of the supported catalysts of the present invention is preferably performed in a single reactor.

The present invention is particularly suitable for use with metallocene complexes which have been treated with polymerisable monomers. Our earlier applications WO 04/020487 and WO 05/019275 describe supported catalyst compositions wherein a polymerisable monomer is used in the catalyst preparation.

Particularly preferred single site catalyst systems for use in the method of the present invention are those wherein the cocatalyst is a non-aluminoxane.

Thus according to another aspect of the present invention there is provided a method for the preparation of a supported polymerisation catalyst system, said method comprising
(1) contacting together in a suitable solvent
  (a) a metallocene complex,
  (b) a non-aluminoxane cocatalyst,
  (c) a porous support material, and
  (d) a polymerisable monomer,
(2) removal of the solvent.

Polymerisable monomers suitable for use in this aspect of the present invention include ethylene, propylene, 1-butene, 1-hexene, 1-octene, 1-decene, styrene, butadiene, and polar monomers for example vinyl acetate, methyl methacrylate, etc. Preferred monomers are those having 2 to 10 carbon atoms in particular ethylene, propylene, 1-butene or 1-hexene.

Alternatively a combination of one or more monomers may be used for example ethylene/1-hexene.

The preferred polymerisable monomer for use in the present invention is 1-hexene.

The polymerisable monomer is suitably used in liquid form or alternatively may be used in a suitable solvent. Suitable solvents include for example heptane.

The polymerisable monomer may be added to the cocatalyst before addition of the metallocene complex or alternatively the complex may be pretreated with the polymerisable monomer.

The method according to the preferred aspect of the present invention comprises the use of a single-site catalyst system comprising monocyclopentadienyl metallocene complexes and cocatalysts comprising ionic compounds comprising a cation and an anion wherein the anion has at least one substituent comprising a moiety having an active hydrogen.

The supported single site catalysts of the present invention may be suitable for the copolymerisation of olefin monomers selected from (a) ethylene or (b) propylene with one or more α-olefins.

The supported single site catalyst systems of the present invention are most suitable for use in slurry or gas phase processes.

A slurry process typically uses an inert hydrocarbon diluent and temperatures from about 0° C. up to a temperature just below the temperature at which the resulting polymer becomes substantially soluble in the inert polymerisation medium. Suitable diluents include toluene or alkanes such as hexane, propane or isobutane. Preferred temperatures are from about 30° C. up to about 200° C. but preferably from about 60° C. to 100° C. Loop reactors are widely used in slurry polymerisation processes.

Gas phase processes for the polymerisation of olefins, especially for the homopolymerisation and the copolymerisation of ethylene and α-olefins for example 1-butene, 1-hexene, 4-methyl-1-pentene are well known in the art.

Typical operating conditions for the gas phase are from 20° C. to 100° C. and most preferably from 40° C. to 85° C. with pressures from subatmospheric to 100 bar.

Particularly preferred gas phase processes are those operating in a fluidised bed. Examples of such processes are described in EP 89691 and EP 699213 the latter being a particularly preferred process for use with the supported catalysts of the present invention.

The preferred α-olefins are 1-butene, 1-hexene, 4-methyl-1-pentene and 1-octene.

Most preferred α-olefin is 1-hexene.

The ethylene-α-olefin copolymers of the present invention typically have a density in the range 0.900-0.930 g/cm$^3$ and preferably in the range 0.910-0.925 g/cm$^3$.

The ethylene-α-olefin copolymers of the present invention typically have a molecular weight distribution in the range 3-5 and preferably in the range 3.5-4.5.

By use of the single site catalysts of the present invention copolymer products may be obtained that are considerably lower in gels. The low level of gels produced with the catalyst of the invention is particularly significant with respect to the use of the polymers in for example highly demanding blown film applications.

The present invention will now be illustrated with reference to the accompanying examples:
Abbreviations
TEA triethylaluminium
Ionic Compound A [N(H)Me(C$_{18-22}$H$_{37-45}$)$_2$]B[(C$_6$F$_5$)$_3$(p-OHC$_6$H$_4$)]
Complex A (C$_5$Me$_4$SiMe$_2$N$^t$Bu)Ti(η$^4$-1,3-pentadiene)

EXAMPLE 1

Preparation of Catalyst Component 1

To 337.0 kg of a 10.72 wt. % solution of Ionic Compound A in toluene were added over a period of 15 minutes 27.4 kg of a 13.1 wt. % TEA solution in isohexane. The mixture was further stirred for 15 minutes to yield a solution of catalyst component 1.

Preparation of a Mixture of Metallocene Complex and 1-Hexene

To 109.3 kg of a 9.94 wt. % solution of Complex A in heptane were added 83.0 kg of 1-hexene.

Treatment of Silica with TEA

Under continuous agitation, 1491 L of isohexane and 397 kg of silica D948 (available from W.R. Grace), were added to a reactor. (The silica had been previously calcined under nitrogen to reach a level of hydroxyl groups of 1.53 mmol/g). 19.3 kg of an Octastat 2000 (available from Innospec) solution in pentane (2 g/l) was the added and the mixture was stirred for 15 minutes. 571 kg of a 12% triethylaluminium (TEA) solution in isohexane was then slowly added over 1 hour and the mixture was stirred for 1 hour further at 30° C. The slurry was filtered and thoroughly washed with isohexane before being transferred to a dryer. 19 kg of an Octastat 2000 solution in pentane (2 g/l) was added and the mixture was finally dried at 60° C. under vacuum.

428 kg of silica/TEA were obtained. The aluminium content of the solid was found to be 1.3 mmol/g.

Preparation of the Supported Catalyst 499 kg of the silica/TEA containing Octastat 2000 were introduced into a reactor. The above prepared solution of catalyst component 1 was fed to the reactor over a period of 45 minutes and the mixture was then stirred for a further 30 minutes.

The contents of the reactor were then cooled to 14° C. and the above prepared solution of metallocene complex A and 1-hexene was fed over a period of 30 minutes, and then the mixture was further stirred for 2.5 hours. During the addition the internal temperature increased to a maximum of 26° C.

57.4 kg of an Octastat 2000 solution in pentane (2 g/l) was added over a period of 30 minutes and the mixture was then dried at 45° C. (24 hours) under dynamic vacuum. During the drying process the ingression of air was minimized and no nitrogen back fill was performed. Analysis of the resulting dry powder showed the titanium content to be 46.1 µmol/g, the boron content to be 47.4 µmol/g, the aluminium content to be 1.06 mmol/g and the residual solvent to be 0.65 wt. %.

EXAMPLE 2

Polymerisations

The supported catalyst was tested in a continuous fluidized bed gas phase pilot plant using the process conditions described in Table 1. A continuous feed of Octastat 2000 was maintained vs. the ethylene feed rate. In each case a linear low density ethylene/1-hexene co-polymer was prepared.

TABLE 1

| Process Conditions | |
|---|---|
| Polymerisation temperature (° C.) | 83 |
| Pressure (bar) | 20 |
| Bed height (m) | 5.8-6.0 |
| Fluidisation velocity cm/s | 45-48 |
| Residence time (hr) | 5.7-5.9 |
| Ethylene flow rate (kg/hr) | 140 |
| Partial pressure of ethylene (bar) | 12.8-13.5 |
| Gas phase hydrogen/ethylene ratio | 0.0022-0.0024 |
| Gas phase 1-hexene/ethylene ratio | 0.0044-0.0056 |
| Partial pressure of pentane (bar) | 1 |
| Octastat 2000 (ppm) relative to ethylene feed | 5-10 |

Product Analyses
1. Pelletisation

Reactor powder was compounded on a pilot scale extrusion line (Coperion ZSK 58 twin screw extruder) with the conditions given in Table 2 below. An additive formulation comprised 400 ppm of Irganox 1010 and 800 ppm of Irgafos 168.

The main extruder settings are given below in Table 2.

The temperature of the melt at the gear pump inlet is typically 245° C.

The specific energy is typically 0.17 Kwh/Kg.

These conditions are typical of extrusion regimes used in industry for the similar resins.

TABLE 2

| Extrusion conditions | |
|---|---|
| Flow rate (kg/h) | 266.3 |
| Feed hopper oxygen level (%) | 0 |
| Screw speed (rpm) | 324 |
| Temperature of barrel zone 2 (° C.) | 160 |
| Temperature of barrel zone 3 (° C.) | 180 |
| Temperature of barrel zone 4 (° C.) | 210 |
| Temperature of barrel zone 5 (° C.) | 240 |
| Temperature of throttle valve (° C.) | 220 |
| Valve position (°) | 48 |
| Melt pressure Pm4 (suction) (Bar) | 39 |
| Temperature of transition piece (° C.) | 220 |
| Temperature of Die (° C.) | 220 |

2. Optical Control System (OCS) for Counting Gels

The gels content was measured by the Optical Control Systems device ME-20/26 V2 type consisting of a 20 mm single screw extruder, a flat die, a chill roll, a winding station and an optical detector. The following conditions were used:

Screw speed: 25 rpm

Temperature profile (from feeding section to the head): 190-200-205-210-215-220° C.

Chill Roll temperature: 75° C.

Take off speed: 2.5 m/min

Winder tension: 5%

Roll torque: 5 N.m

A reference product was tested before each set of new measurements on the OCS using the same processing conditions; this reference was a 0.9MI LLDPE resin used for blown film applications (reference XF660) and a Statistical Process Control analysis was done to confirm that the OCS was performing correctly. For each product tested by OCS, 2 consecutive measurements were performed, and if they were in the same range, the average value was reported as a result. If not, a third measurement was performed.

Table 3 summarises the gel levels for films produced from copolymers according to the present invention. Example 1 represent a film prepared from a copolymer produced under the above described polymerization conditions with a pentane partial pressure of 1 bar and Example 2 from a copolymer produced with a pentane partial pressure of 0.5 bar.

Films prepared from commercially available polymers are also listed for comparison.

TABLE 3

| Catalyst | Density (g/cm$^3$) | Melt index (g/10 min) | 100 < Nb < 300 µm gels/m$^2$ | 300 < Nb < 500 µm gels/m$^2$ | 500 < Nb < 2000 µm gels/m$^2$ | Total 100 < Nb < 2000 µm gels/m$^2$ |
|---|---|---|---|---|---|---|
| Example 1 | 0.917 | 1.1 | 445 | 4 | 1 | 450 |
| Example 2 | 0.917 | 1.1 | 447 | 6 | 1 | 454 |
| LL0209AA | 0.920 | 0.9 | 473 | 24 | 4 | 500 |

LL0209AA is a ethylene-butene copolymer from Ineos Polyolefins produced by a Ziegler Natta catalysed gas phase polymerization.

Density was measured using a density column according to ISO 1872/1 method.

As can be seen from Table 3 the catalyst according to the present invention yielded polymer products that exhibit a low level of gels. The low level of gels produced with the inventive catalyst is significant with respect to the use of the resin in highly demanding blown film applications.

The invention claimed is:

1. A method for the preparation of a blown film containing 300-600 gels/m$^2$ of size in the range 100-2000 µm as measured by an optical control system device ME-20/26 V2 type consisting of a 20 mm single screw extruder, a flat die, a chill roll, a winding station and an optical detector as follows screw speed 25 rpm, temperature profile 190-200-205-210-215-220° C., chill roll temperature 75° C., take off speed 2.5 m/min, winder tension of 5% and roll torque of 5 Nm, said film being derived by extrusion of an ethylene-α-olefin copolymer, said method comprising preparing said ethylene-α-olefin copolymer in a particle forming polymerisation process in the presence of a single site catalyst system comprising:

(a) a single site catalyst, (b) a cocatalyst, and (c) a support material.

2. A method according to claim 1 wherein the film contains 300-500 gels/m² of size in the range 100-2000 μm.

3. A method according to claim 1 wherein the α-olefin is selected from the group consisting of 1-butene, 1-hexene, 4-methyl-1-pentene and 1-octene.

4. A method according to claim 3 wherein the α-olefin is 1-hexene.

5. A method according to claim 1 wherein the ethylene-α-olefin copolymer has a density in the range 0.900 -0.930 g/cm³.

6. A method according to claim 5 wherein the ethylene-α-olefin copolymer has a density in the range 0.910 -0.925 g/cm³.

7. A method according to claim 1 wherein the single site catalyst is a metallocene.

8. A method according to claim 7 wherein the metallocene is a monocylcopentadienyl metallocene complex.

9. A method according to claim 7 wherein the metallocene has the general formula:

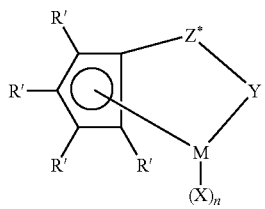

wherein:—

R' each occurrence is independently selected from the group consisting of hydrogen, hydrocarbyl, silyl, germyl, halo, cyano, and combinations thereof, said R' having up to 20 nonhydrogen atoms, and optionally, two R' groups where R' is not hydrogen, halo or cyano together form a divalent derivative thereof connected to adjacent positions of the cyclopentadienyl ring to form a fused ring structure;

X is hydride or a moiety selected from the group consisting of halo, alkyl, aryl, aryloxy, alkoxy, alkoxyalkyl, amidoalkyl, siloxyalkyl having up to 20 non-hydrogen atoms and neutral Lewis base ligands having up to 20 non-hydrogen atoms;

Y is —O—, —S—, —NR*—, —PR*—;

M is hafnium, titanium or zirconium,

Z* is SiR*₂, CR*₂, SiR*₂Sm*₂, CR*₂CR*₂, CR*=CR*, CR*, CR*₂SiR*₂, or GeR*₂, wherein:

R* each occurrence is independently hydrogen, or a member selected from the group consisting of hydrocarbyl, silyl, halogenated alkyl, halogenated aryl, and combinations thereof, said R* having up to 10 non-hydrogen atoms, and optionally, two R* groups from Z* when R* is not hydrogen, or an R* group from Z* and an R* group from Y form a ring system; and n is 1 or 2 depending on the valence of M.

10. A method according to claim 7 wherein the metallocene has the general formula:

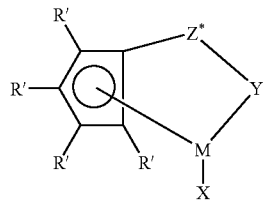

wherein:—

R' each occurrence is independently selected from the group consisting of hydrogen, hydrocarbyl, silyl, germyl, halo, cyano, and combinations thereof, said R' having up to 20 non-hydrogen atoms, and optionally, two R' groups where R' is not hydrogen, halo or cyano together form a divalent derivative thereof connected to adjacent positions of the cyclopentadienyl ring to form a fused ring structure;

X is a neutral η⁴ bonded diene group having up to 30 non-hydrogen atoms, which forms a π-complex with M;

Y is —O—, —S—, —NR*—, —PR*—;

M is titanium or zirconium in the +2 formal oxidation state;

Z* is SiR*₂, CR*₂, SiR*₂SiR*₂, CR*₂CR*₂, CR*=CR*, CR*₂SiR*₂, or GeR*₂, wherein:

R* each occurrence is independently hydrogen, or a member selected from the group consisting of hydrocarbyl, silyl, halogenated alkyl, halogenated aryl, and combinations thereof, said R* having up to 10 non-hydrogen atoms, and optionally, two R* groups from Z* when R* is not hydrogen, or an R* group from Z* and an R* group from Y form a ring system.

11. A method according to claim 10 wherein M is titanium.

12. A method according to claim 1 wherein the cocatalyst has the general formula:

(L*-H)⁺_d(A^{d"})

wherein

L* is a neutral Lewis base (L*-H)⁺_d is a Bronsted acid

A^{d"} is a non-coordinating compatible anion having a charge of d", and d is an integer from 1 to 3.

13. A method according to claim 12 wherein the cocatalyst comprises ionic compounds comprising a cation and an anion wherein the anion has at least one substituent comprising a moiety having an active hydrogen.

14. A method according to claim 1 wherein the support material is silica.

15. A method according to claim 1 wherein the polymerisation process is performed in the gas phase or the slurry phase.

16. A method for the preparation of a blown film containing 300-600 gels/m² of size in the range 100-2000 μm as measured by an optical control system device ME-20/26 V2 type consisting of a 20 mm single screw extruder, a flat die, a chill roll, a winding station and an optical detector as follows screw speed 25 rpm, temperature profile 190-200-205-210-215-220° C., chill roll temperature 75° C., take off speed 2.5 m/min, winder tension of 5% and roll torque of 5 Nm, said film being derived by extrusion of an ethylene-α-olefin copolymer, said method comprising preparing said ethylene- α-olefin copolymer in a particle forming polymerisation process in the presence of a single site catalyst system comprising:
(a) a metallocene complex,
(b) a non-aluminoxane cocatalyst,
(c) a support material, and
(d) a polymerisable monomer.

17. A method according to claim 16 wherein the polymerisable monomer is 1-hexene.

18. A method according to claim 16 wherein the single-site catalyst system is prepared by:
contacting together in a suitable solvent
(a) a metallocene complex,
(b) a non-aluminoxane cocatalyst,
(c) a porous support material, and
(d) a polymerisable monomer, and
removing the solvent.

19. A method according to claim 18 wherein the metallocene is a monocyclopentadienyl metallocene complex.

20. A method according to claim 18 wherein the cocatalyst comprises ionic compounds comprising a cation and an anion wherein the anion has at least one substituent comprising a moiety having an active hydrogen.

21. A blown film containing 300-600 gels/$m^2$ of size in the range 100-2000 μm as measured by an optical control system device ME-20/26 V2 type consisting of a 20 mm single screw extruder, a flat die, a chill roll, a winding station and an optical detector as follows screw speed 25 rpm, temperature profile 190-200-205-210-215-220° C., chill roll temperature 75° C., take off speed 2.5 m/min, winder tension of 5% and roll torque of 5 Nm, said film being derived by extrusion of an ethylene-α-olefin copolymer having a density in the range 0.900 -0.930 g/$cm^3$ and prepared in a particle forming polymerisation process in the presence of a single site catalyst system comprising:
(a) a single site catalyst,
(b) a cocatalyst, and
(c) a support material.

22. A film according to claim 21 containing 300-500 gels/$m^2$ of size in the range 100-2000 μm.

23. A film according to claim 21 wherein the μ-olefin is 1-hexene.

* * * * *